(12) United States Patent
Polozola

(10) Patent No.: US 8,031,052 B2
(45) Date of Patent: Oct. 4, 2011

(54) SYSTEMS AND METHODS FOR RADIO FREQUENCY IDENTIFICATION

(75) Inventor: Michelle L. Polozola, Richardson, TX (US)

(73) Assignee: Securus Technologies, Inc., Dallas, TX (US)

( * ) Notice: Subject to any disclaimer, the term of this patent is extended or adjusted under 35 U.S.C. 154(b) by 1351 days.

(21) Appl. No.: 11/562,855

(22) Filed: Nov. 22, 2006

(65) Prior Publication Data

US 2008/0117022 A1  May 22, 2008

(51) Int. Cl.
  *H04Q 1/00* (2006.01)
(52) U.S. Cl. .................. 340/10.1; 340/5.61; 379/188
(58) Field of Classification Search ............ 340/10.1, 340/10.5, 5.61, 5.74, 572.1, 572.8, 573.4, 340/10.3; 379/55.1, 93.02, 93.03, 93.26, 379/93.36, 189, 194, 188; 455/410, 411; 235/375, 376, 377, 380
See application file for complete search history.

(56) References Cited

U.S. PATENT DOCUMENTS

| | | | | |
|---|---|---|---|---|
| 4,707,592 | A * | 11/1987 | Ware | 235/379 |
| 5,343,514 | A * | 8/1994 | Snyder | 379/93.01 |
| 7,102,509 | B1 | 9/2006 | Anders et al. | |
| 2003/0043135 | A1 | 3/2003 | Chia | |
| 2005/0043014 | A1* | 2/2005 | Hodge | 455/411 |
| 2005/0270158 | A1 | 12/2005 | Corbett, Jr. | |
| 2006/0169768 | A1 | 8/2006 | Gangi | |
| 2007/0116211 | A1* | 5/2007 | Csabai et al. | 379/93.03 |

OTHER PUBLICATIONS

U.S. Appl. No. 10/135,878, Viola et al.
U.S. Appl. No. 10/642,532, Robert L. Rae.
U.S. Appl. No. 10/701,549, Rajesh R. Hingorance.
U.S. Appl. No. 11/125,842, Keiser et al.
U.S. Appl. No. 11/338,868, Rogers et al.
U.S. Appl. No. 11/480,259, Luke Keiser.
U.S. Appl. No. 11/480,335, Polozola et al.
International Search Report for International Patent Application No. PCT/US 07/85114 dated May 16, 2008.
WIPO, International Preliminary Report on Patentability, PCT/US2007/085114, May 26, 2009, Geneva, Switzerland.
USPTO, Written Opinion of the International Searching Authority, PCT/US2007/085114, May 16, 2008, Alexandria, Virginia.

* cited by examiner

*Primary Examiner* — Edwin Holloway, III
(74) *Attorney, Agent, or Firm* — Fogarty, L.L.C.

(57) ABSTRACT

Systems and methods providing radio frequency identification (RFID) of individuals, as may be implemented with respect to a controlled environment facility, using RFID transducer technology deployed in association with a user terminal, such as telephone or multimedia kiosk, are shown. Embodiments operate to identify residents of a controlled environment facility and control one or more transactions associated with the residents and/or actions of the residents using a RFID system in which a user presents a RFID transponder in proximity to a RFID transducer for identification. RFID tags of embodiments comprise data which identifies an individual, data which may be used to identify an individual, or a combination of both. RFID systems of embodiments are adapted to utilize existing communication links for identification of individuals using RFID and/or for controlling transactions, such as calls, using RFID.

65 Claims, 4 Drawing Sheets

US 8,031,052 B2

SYSTEMS AND METHODS FOR RADIO FREQUENCY IDENTIFICATION

CROSS-REFERENCE TO RELATED APPLICATIONS

The present application is related to commonly assigned U.S. patent applications Ser. No. 10/135,878 entitled "Information Management and Movement System and Method," filed Apr. 29, 2002, (now abandoned); Ser. No. 11/125,842 entitled"Processor-Based Self-Service Terminals Used with Respect to Controlled Environment Facilities," filed May 10, 2005, Ser. No. 11/338,868 entitled "Systems and Methods for Transaction and Information Management," filed Jan. 24, 2006, Ser. No. 10/642,532 entitled "Centralized Call Processing," filed Aug. 15, 2003,)issued as U.S. Pat. No. 7,899,164); Ser. No. 10/701,549 entitled "Systems and Methods for Cross-Hatching Biometrics With Other Identifying Data," filed Nov. 5, 2003,(issued as U.S. Pat. No. 7,278,028); Ser. No. 11/480,335 entitled "Systems and Methods for Multimedia Visitation," filed Jun. 30, 2006, (now abandoned); and Ser. No. 11/480,259 entitled "System and Method for Electronic Visitation Registration," filed Jun. 30, 2006, (now abandoned); the disclosures of which are hereby incorporated herein by reference.

TECHNICAL FIELD

The present invention relates generally to identification systems, and more particularly, to radio frequency identification, as may be implemented with respect to a controlled environment facility.

BACKGROUND OF THE INVENTION

Controlled environment facilities, such as prison facilities, hospitals, nursing homes, and camps, often implement a certain amount of control with respect to various activities involving residents thereof. For example, communications in or out of such controlled environment facilities may be allowed, restricted, interrupted, redirected, monitored, and/or recorded for some or all residents for security reasons. Access to specific areas of controlled environment facilities may also be tightly controlled for some or all residents. Often, controlled environment facilities may place different limitations on residents associated therewith with respect to a plurality of activities. Accordingly, controlled environment facilities must be operable to identify the residents in order to effectively control such activities.

In a prison facility, for example, phone calls to and from inmates are typically tightly controlled. Accordingly, various call processing systems have been implemented through which inmate calls into and out of a prison facility are allowed, restricted, interrupted, redirected, monitored, and/or recorded. Such call processing systems generally comprise a number of ports through which telephone trunks of the public switched telephone network (PSTN) are coupled to analog telephone lines associated with telephone terminals disposed in inmate accessible areas of the prison facility. Before one of the telephone terminals disposed in inmate accessible areas of the prison facility are placed in communication with the PSTN, logic of the call processing system will make a validation determination with respect to whether the call should be connected, such as to determine if an inmate making or accepting a call is allowed phone privileges, if calls are allowed at the time of the call, if calls are allowed to or from the particular telephone terminal, etcetera.

Most prison facilities employ call validation methods which rely on the use of a personal identification number (PIN) to identify an individual, such as an inmate, and determine if a call is allowed or not. A call processing system in association with a prison facility prompts an inmate attempting a call to enter his PIN number, either before or after the telephone number is dialed. The PIN number allows the call processing system to identify the inmate and determine if the desired telephone call should be connected. A problem with utilizing a PIN number to identify an inmate for call validation purposes is that a PIN number may be easily traded, sold or stolen within a prison facility. In this way, an inmate may evade calling restrictions placed on him by the prison facility by utilizing another inmate's PIN number. Accordingly, there is a potential for harassment with calls being made to restricted numbers (e.g., victims, witnesses, judges, etcetera), the coordination of external/internal illegal business operations from within the facility, gang activity being coordinated from within facilities, riots or other activities being coordinated within and between facilities, and/or the general loss of command and control by facility leadership. In addition to posing a serious security risk, calls placed by inmates utilizing PIN numbers other than their own reduce the effectiveness of a facility's investigatory process. For example, even when a call posing a security risk is monitored or recorded by the facility, the inmate responsible for the security violation might escape identification and punishment by placing the call using another inmate's PIN number. Furthermore, a wrong inmate could be identified as the guilty party and penalized.

BRIEF SUMMARY OF THE INVENTION

The present invention is directed to systems and methods providing radio frequency identification (RFID) of individuals, as may be implemented with respect to a controlled environment facility, using RFID transducer (also referred to herein as a RFID reader or scanner) technology deployed in association with a user terminal, such as telephone or multimedia kiosk. For example, embodiments operate to identify residents of a controlled environment facility and control one or more transactions associated with the residents and/or actions of the residents using a RFID system in which a user presents a RFID transponder (also referred to herein as RFID tags or chips) in proximity to a RFID transducer for identification.

Preferably, RFID readers are designed to withstand harsh conditions, such as physical abuse, chemical abuse, high temperatures, high humidity, etcetera. Accordingly, embodiments of the present invention provided a hardened or protected RFID transducer disposed on the surface of or near a user terminal, while other embodiments provide a RFID transducer within a user terminal. RFID readers of embodiments may comprise portable and/or fixed RFID readers.

RFID tags of embodiments of the present invention comprise data which identifies an individual, data which may be used to identify an individual, or a combination of both. For example, RFID tags of embodiments may comprise an individual's identification number, identification code, name, picture, social security number, date of birth, age, nationality, race, height, weight, eye color, hair color, and/or any other information that may be used for identification purposes. Such RFID tags are preferably provided in a configuration readily associable with an individual, whether permanently or temporarily. For example, RFID tags of preferred embodiments comprise RFID bracelets or wristbands which, once securely attached to an individual, are designed so that they are rendered inoperable if removed. RFID tags of embodiments may additionally or alternatively be disposed within badges, articles of clothing, or even implanted in the tissue of an individual.

RFID readers may be in communication with a computer, a screen, a printer or any other object or device operable to process, display, and/or print data. Preferred embodiments of the invention place RFID readers in communication with a processing system, such as a call processing system or other transaction processing system, operating in association with a controlled environment facility, such that data obtained from a resident's RFID tag is sent to the processing system for processing and/or storing. Preferably, the processing system identifies the resident using the data. Accordingly, a user may be required, such as by prompting, to present a RFID tag in proximity to a RFID reader in order to access one or more features of a user terminal or which are otherwise available through use of the user terminal. Presentation of a RFID tag may be at various times, periodically, or constantly, as desired for security or other purposes.

RFID systems of embodiments of the invention are adapted to utilize existing communication links for identification of individuals using RFID and/or for controlling transactions, such as calls, using RFID. Moreover, embodiments of the invention are adapted to retrofit existing user terminals for acceptance of a RFID transducer. For example, RFID transducers of embodiments of the invention preferably utilize analog telephone communication lines to communicate RFID information from a user terminal, such as a telephone terminal retrofitted to include a RFID transducer, and a processing system, such as a call processing system adapted to include RFID system control algorithms according to the present invention.

It should be appreciated that embodiments of the present invention may leverage the use of a processing system already deployed for processing communications. For example, a call placed through a RFID system may be treated using the same algorithms used for calls placed using a PIN number, such as to determine if calls are allowed for a resident, to determine if calls are allowed from and/or to a certain phone number, to determine if calls are allowed at the current time of day, to determine if the call is to be recorded, to determine if an investigator is to be notified, etcetera. Additionally or alternatively, a processing system may implement control algorithms unique to communications placed through a RFID system. For example, a processing system may verify the identity of the resident at specific and/or random times during the duration of a call, may collect call details such as time, date and duration of the call, dialed number, and/or telephone used, may collect other information such as a voice sample of the resident attempting the call or a recording of the call, and/or the like, for investigative purposes while either allowing or blocking an unauthorized call, etcetera.

Embodiments of the present invention provide a reliable and low-cost alternative for identifying residents and controlling actions associated with a controlled environment facility, such as a prison facility (e.g. jail, stockade, prison, penitentiary, etcetera), hospitals, nursing homes, camps, and/or the like. In addition to providing improved security through controlling any or all resident's actions, embodiments of the invention provide enhanced investigatory tools for the controlled environment facility through monitoring and/or recording actions of positively identified residents. Accordingly, embodiments operate to provide increased security for the residents and management of controlled environment facilities while expanding investigatory potential for the facility. Moreover, using systems and methods of the present invention, law enforcement is provided a choice in how security violations are managed within a controlled environment facility.

In identifying residents of a controlled environment facility, for example, embodiments of the present invention deploy one or more radio frequency identification (RFID) systems, such as may comprise at least one RFID reader and at least one RFID tag, in association with a controlled environment facility. Embodiments "tag" each resident of the controlled environment facility to be identified by securely associating a RFID tag to each resident, such as using a bracelet or other substantially permanently associated or attached item. Such RFID tags comprise data which is associated with the identity of the resident carrying it. RFID readers are operable to obtain data from a RFID tag attached to a resident and transmit such data to any systems and/or devices it is in communication with. Additionally or alternatively, embodiments may tag visitors, such as using a badge or other temporarily attached item, associated with a controlled environment facility such that the visitors may be identified according to embodiments of the present invention.

In monitoring and/or controlling actions within a controlled environment facility, embodiments deploy one or more RFID systems in association with a controlled environment facility. Embodiments provide objects or devices within a controlled environment facility, to which one or more tagged residents should have controlled access to, with a RFID reader. Embodiments place RFID readers in communication with a processing system operating in association with the controlled environment facility, such that a tagged resident attempting an action via one of the foregoing objects or devices may be identified by the processing system and the action may be controlled in accordance with the logic of the processing system. For example, processing system of embodiments may monitor and/or control communications via a communications device, entering or exiting an area via a door or gate, etcetera.

Embodiments of the invention monitor and/or control telephone calls, whether inbound or outbound, by providing a RFID reader in association with one or more telephones disposed within the controlled environment facility. RFID readers are preferably in communication with a processing system operating in association with the controlled environment facility, such that a call placed using one of the foregoing telephones by a tagged resident is subject to monitoring and/or control by the processing system in accordance with the logic of the processing system. Additionally or alternatively, embodiments may tag visitors of a controlled environment facility such that communications attempted by such visitors may be monitored and/or controlled. For example, a prison facility may tag an inmate and tag a visitor so that a visitation call may be subject to monitoring and/or control by a processing system in association therewith.

Embodiments may operate to control communications in a variety of modes. For example, embodiments of the invention may operate in a stealth mode such that a call is completed without a party to the communication realizing the communication has been identified as a security violation by a processing system in association with a controlled environment facility. In such a stealth mode various control features, such as call allowing, blocking, recording, monitoring, locating, re-routing, call detail collection, etcetera, may be implemented without the calling and/or called party's knowledge. Additionally or alternatively, a public mode may be provided to announce or otherwise make public that calls or particular calls are subject to control (e.g., including allowing, blocking, recording, monitoring, locating, re-routing, call detail collection, etcetera) by a processing system in association with a controlled environment facility.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

To aid in understanding of the concepts of the present invention, some embodiments will be described herein with reference to a prison facility. It should be appreciated, however, that the present invention is not limited to application with respect to prison facilities and may readily be applied to a variety of controlled environment facilities, such as hospitals, nursing homes, camps, dormitories, campuses, etcetera.

Figure 1:
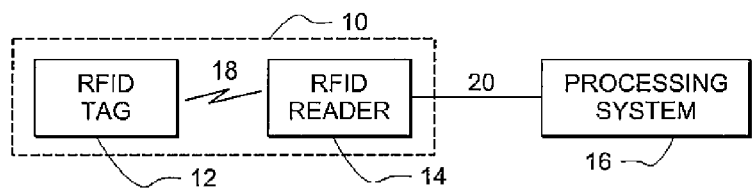
FIG. 1 shows a block diagram of a RFID system used to identify residents associated with a controlled environment facility in accordance with an embodiment of the present invention.

Directing attention to FIG. 1, a block diagram illustrating a RFID system adapted for use in identifying residents of a controlled environment facility is shown according to an embodiment of the present invention. Specifically, RFID system 10 includes at least one RFID tag 12 and at least one RFID reader 14. RFID tag 12 shown is suitable for affixing securely to a resident of the controlled environment facility, and contains data associated with the resident's identity, such as an identification number. RFID tag 12 is coupled with RFID reader 14 via communication link 18 (shown here as a wireless link). RFID tag 12 and RFID reader 14 are operable to send and/or receive information over communication link 18, which uses a standard radio frequency communication protocol. RFID system 10 is placed in communication with processing system 16 via communication link 20. RFID reader 14 and processing system 16 are operable to send and/or receive information over communication link 20.

Processing system 16 of embodiments of the present invention works in conjunction with RFID reader 14 to identify the resident. Processing system 16 of embodiments may provide processing in addition to RFID processing as described herein. For example, processing system 16 may comprise a transaction processing system providing transaction processing, such as call processing, commissary purchasing, facility management, etcetera, with respect to a controlled environment facility. Detail with respect to various configurations of transaction processing systems which may be adapted in accordance with embodiments of the present invention are shown in the above referenced patent applications entitled "Information Management and Movement System and Method," "Systems and Methods for Transaction and Information Management," and "Centralized Call Processing." According to embodiments of the invention, such transaction processing systems are adapted to execute algorithms for providing operation as described herein.

Communication link 20 may follow any communications protocol that allows RFID reader 14 to communicate with processing system 16. RFID reader 14 may be coupled to processing system 16 via wireline links, wireless links, and/or any other media supporting communication as described herein, and may comprise various links such as a local area network (LAN) link, metropolitan area network (MAN) link, wide area network (WAN), Internet link, wireless LAN (WLAN) link, public switched telephone network (PSTN), plane old telephone service (POTS) link, and/or the like. According to preferred embodiments, communication link 20 comprises a same link as used by a user terminal (not shown) associated with RFID reader 14. For example, processing system 16 may comprise a call processing system adapted to utilize RFID information in accordance with an embodiment of the present invention and RFID reader 14 may be disposed in association with a telephone. Communication link 20 of this exemplary embodiment may comprise a link used to carry voice signals between the telephone and processing system 16 (e.g., an analog telephone link, a voice over Internet protocol (VoIP) link, etcetera) as well as data between RFID reader 14 and processing system 16.

Processing system 16 may be disposed locally to RFID reader 14 or remotely with respect to RFID reader 14. Moreover, processing system 16 may be disposed locally to a controlled environment facility for which processing is provided by processing system 16 or remotely with respect thereto. Exemplary embodiments disposing processing systems as may be utilized according to embodiments of the present invention locally and remotely are shown in the above referenced patent applications entitled "Information Management and Movement System and Method" and "Centralized Call Processing." In providing operation according to embodiments of the present invention, processing system 16 and/or RFID reader 14 may additionally be in communication with various devices and/or systems. Moreover, RFID system 10 may include processing system 16 in embodiments of the present invention.

Figure 2:
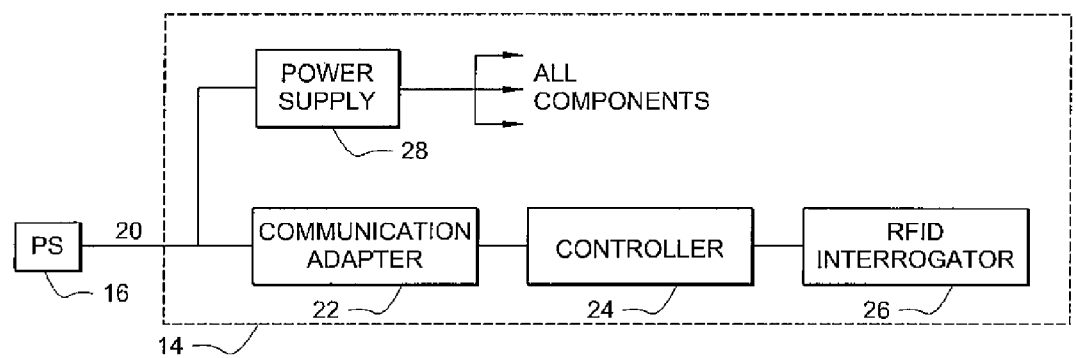
FIG. 2 shows a block diagram of a RFID reader adapted for use in identifying residents associated with a controlled environment facility in accordance with an embodiment of the present invention.

Referring now to FIG. 2, a block diagram of a RFID reader according to an embodiment of the present invention is shown. Specifically, detail with respect to an embodiment of RFID reader 14 is shown. RFID reader 14 of the illustrated embodiment includes communication adapter 22, which is operable to communicate with processing system 16 via communication link 20. RFID reader 14 also contains controller 24 connected with communication adapter 22 and RFID interrogator 26. RFID interrogator 26 contains an antenna and is operable to communicate with RFID tag 12 (FIG. 1) via communication link 18 (FIG. 1). RFID reader 14 also includes power source 28, which in the illustrated embodiment draws power from communication link 20, connected with the appropriate components of RFID reader 14 and provides power thereto.

According to a preferred embodiment, RFID reader 14 is adapted to withstand harsh conditions, such as physical abuse, chemical abuse, high temperatures, high humidity, etcetera. Accordingly, the components illustrated in FIG. 2 may be encased in a substantially impermeable housing, such as a monolithic epoxy covering which is substantially radio frequency (RF) transparent but which is water, gas, and/or shock resistant, to protect the components of RFID reader 14. According to embodiments of the invention, an epoxy covering is formed as a rectangular mass (e.g., a "brick") to completely incarcerate the components of RFID reader 14, while passing a portion of communication link 20 through a surface of the epoxy covering for connection to processing system 16. Such an epoxy structure may be provided with fastening means, such as studs extending therefrom, receiver formed therein, etcetera, to facilitate secure mounting of RFID reader 14.

Figure 3:
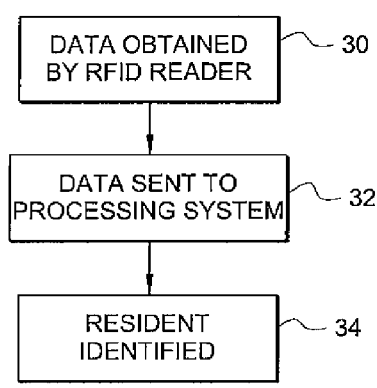
FIG. 3 shows a flowchart of a method for identifying a resident within a controlled environment facility in accordance with an embodiment of the present invention.

Directing attention to FIG. 3, a flowchart of a method for identifying a resident of a controlled environment facility according to an embodiment of the present invention is shown. In the first step, 30, data in RFID tag 12 is obtained by RFID reader 14. The data is then sent to processing system 16 in step 32. In step 34, processing system 16 identifies the resident using the data.

Embodiments of the method shown in FIG. 3 will be described in more detail referring back to FIGS. 1 and 2. In accordance with embodiments of the invention, RFID interrogator 26 transmits an RF read signal over communication link 18 and activates RFID tag 12. RFID tag 12 responds to the RF read signal by sending the data back over communication link 18 to RFID interrogator 26. In some embodiments, the data is an identification number or code, although other data may be provided by RFID tag 12 in addition to or in the alternative to an identification number or code, such as name, biometric vector information, coded biometric sample, password information, etcetera. Preferably, controller 24 sends the data to processing system 16 using communication adapter 22 via communication link 20. The data may be sent using any in band or out of band, wired or wireless signal, such as an in band dual-tone multi-frequency (DTMF) tone in the case of an associated user terminal comprising a telephone.

Processing system 16 of embodiments receives the data and searches for corresponding information in one or more database. Preferably, processing system 16 accesses and/or retrieves information stored in the one or more database corresponding to the data. In some embodiments, the information comprises the name of the resident, the resident's picture, social security number, date of birth, age, nationality, race, height, weight, eye color, hair color, and/or any other information that may be useful for identification purposes. Additionally or alternatively, the information may comprise access, rights, privileges, restrictions, and/or the like associated with the resident. Processing system 16 may then use the retrieved information to validate the resident, to authorize a transaction, etcetera.

Embodiments of processing system 16 include or are in communication with a computer, a monitor, a printer, or any other object or device operable to display, store, and/or print information. Accordingly, embodiments of the present invention may display and/or print the received data and/or retrieved information such that an interested party may view it. Likewise, embodiments of the invention may store the received data and/or retrieved information, such as to create an activity log or other record.

Figure 4:
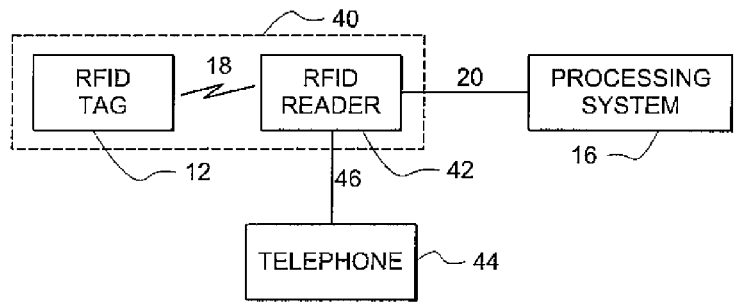
FIG. 4 shows a RFID system used to control communications with respect to a controlled environment facility in accordance with an embodiment of the present invention.

Referring to FIG. 4, a block diagram of a RFID system adapted to control calls or other transactions (e.g., commissary purchases) associated with a controlled environment facility according to an embodiment of the present invention is shown. Specifically, RFID tag 12 is coupled via communication link 18 with RFID reader 42, forming RFID system 40. It should be appreciated that RFID reader 42, and thus RFID system 40, is similar to RFID reader 14 discussed above, except that RFID reader 42 is adapted to interface with a user terminal, shown here as telephone 44. Accordingly, RFID reader 42 is connected with processing system 16 via communication link 20 as discussed above. RFID tag 12 and RFID reader 42 are operable to send and/or receive data over communication link 18 and RFID reader 42 and processing system 16 are operable to send and/or receive data over communication link 20. Communication link 46 connects RFID reader 42 with telephone 44. Processing system 16 is in communication with telephone 44 via RFID reader 42. Additionally or alternatively, processing system 16 may be connected directly to telephone 44. Processing system 16 may comprise a call processing system, commissary purchasing system, or other transaction processing system as discussed above.

It should be appreciated that any number of user terminals, such as computers, personal digital assistants (PDAs), cellular telephones, and/or the like, may be used in accordance with embodiments of the present invention. For example, rather than telephone 44, embodiments of the present invention may implement a multimedia kiosk, such as shown and described in the above referenced patent application entitled "Processor-Based Self-Service Terminals Used with Respect to Controlled Environment Facilities."

Processing system 16 works in conjunction with RFID reader 42 and telephone 44 to control transactions attempted by a resident of a controlled environment facility. Any communication protocol, wired or wireless, that allows RFID reader 42 to communicate with telephone 44 may be utilized by communication link 46 of embodiments. However, according to a preferred embodiment, RFID reader 42 is disposed in a communication link between telephone 44 and processing system 16 used to carry voice signals between telephone 44 and processing system 16 (e.g., an analog telephone link, a voice over Internet protocol (VoIP) link, etcetera). As with RFID reader 14 discussed above, RFID reader 42 may be coupled to processing system 16 via wireline links, wireless links, and/or any other media supporting communication as described herein.

Processing system 16 may be disposed locally to RFID reader 42 or remotely with respect to RFID reader 42. Moreover, processing system 16 may be disposed locally to a controlled environment facility for which processing is provided by processing system 16 or remotely with respect thereto. Exemplary embodiments disposing processing systems as may be utilized according to embodiments of the present invention locally and remotely are shown in the above referenced patent applications entitled "Information Management and Movement System and Method" and "Centralized Call Processing." In providing operation according to embodiments of the present invention, processing system 16 and/or RFID reader 42 may additionally be in communication with various devices and/or systems. Moreover, RFID system 40 may include processing system 16 in embodiments of the present invention.

Figure 5:
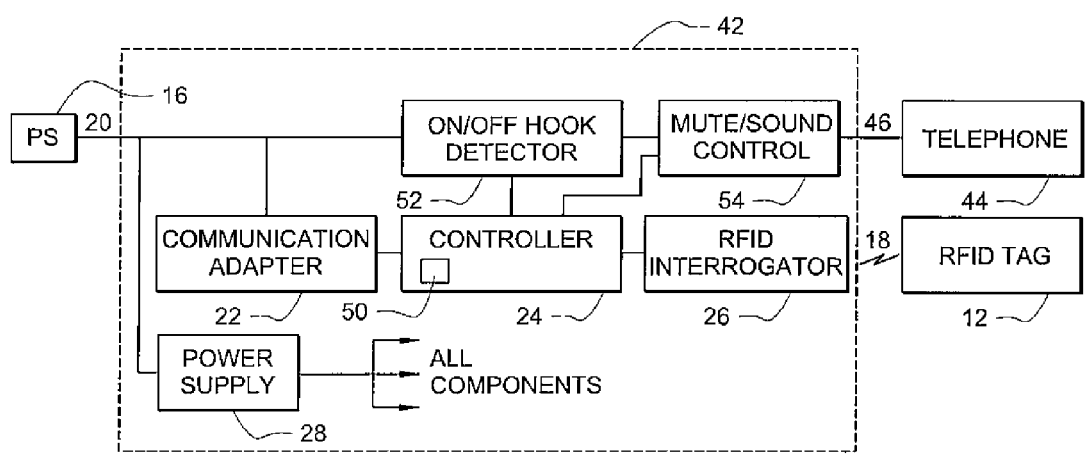
FIG. 5 shows a block diagram of a RFID reader adapted for use in controlling communications with respect to a controlled environment facility in accordance with an embodiment of the present invention.

Referring now to FIG. 5, a block diagram of a RFID reader according to an embodiment of the present invention is shown. Specifically, detail with respect to an embodiment of RFID reader 42 is shown. The illustrated embodiment of RFID reader 42 includes communication adapter 22. Communication adapter 22 is operable to communicate with processing system 16 via communication link 20 and with telephone 44 via communication link 46. RFID reader 42 comprises controller 24, which includes cache memory 50, connected to communication adapter 22. Controller 24 is also connected to RFID interrogator 26, which is operable to communicate with RFID tag 12 via communication link 18. RFID reader 42 of the illustrated embodiment also comprises on/off hook detector 52 and mute/sound control 54 which are in communication with each other and with controller 24. On/off hook detector 52 and mute/sound control 54 are disposed between communication link 20 and communication link 46 to thereby monitor and/or control the link between telephone 44 and processing system 16.

Power source 28 of RFID reader 42 is connected to appropriate components of RFID reader 42 to provide power thereto. According to a preferred embodiment, power supply 28 draws power from communication link 46, such as may comprise loop current of an analog POTS telephone line, to provide power to components of RFID reader 42 without requiring a separate power connection. Accordingly, RFID reader 42 of embodiments may readily be retrofitted to telephones or other user terminals without substantial infrastructure changes.

Figure 6:
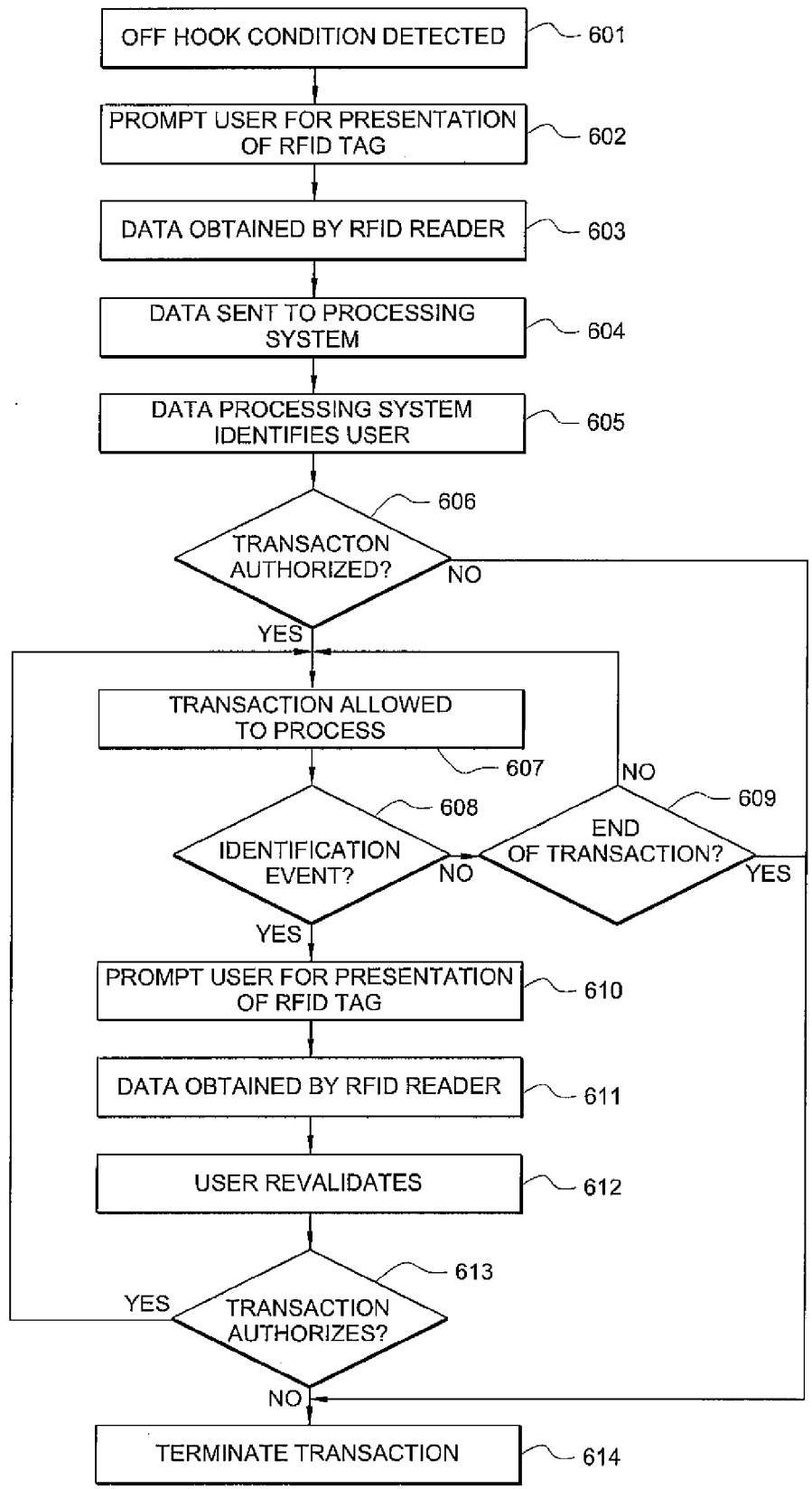
FIG. 6 shows a flowchart of a method for controlling communications associated with a controlled environment facility in accordance with an embodiment of the present invention.

Referring now to FIG. 6, a flowchart of a method for controlling communications with respect to a controlled environment facility according to an embodiment of the present invention is shown. In step 601, controller 50 detects an off hook condition with respect to telephone 44. For example, on/off hook detector 52 may detect a loop current as a receiver of telephone 44 is lifted off hook and provide a control signal to controller 54.

At step 602 the user is prompted to present RFID tag 12 in proximity to RFID reader 42 for identifying the user. For example, processing system 16 may play a message instructing the user to hold a badge or bracelet including RFID tag 12 near RFID reader 42. Alternatively, controller 24 may control mute/sound control 54 to play a message as described above. In operation according to preferred embodiments, the user places RFID tag 12 less than 3 inches away from RFID reader 42 when the user is prompted or hears the appropriate tone.

It should be appreciated that a prompt utilized in accordance with embodiments of the present invention may comprise a voice message, such as may be played in an interactive voice response (IVR) function of processing system 16 and/or mute/sound control 54. However, such prompts may take different forms, such as a tone or tones, a text message, a graphic, etcetera. According to embodiments of the invention, a short aural prompt (e.g., an aural icon or EARCON™) is played. Such a short prompt is useful when prompting a user to present RFID tag 12 during a transaction, such as during a telephone call, to minimize the interruption to the transaction. Accordingly, embodiments of the invention operate to provide a voice message at the beginning of a transaction prompting the user to present RFID tag 12 and explaining the aural prompt used during the transaction to facilitate the user's understanding to represent RFID tag 12 at the appropriate times during the transaction.

Processing system 16 in embodiments plays a calling tutorial for the user when the user picks up the receiver of telephone 44 and dials a phone number. In other embodiments, the user may be directed to dial the phone number during or after the calling tutorial. Additionally or alternatively, the user may become aware of calling procedures from written directions displayed on telephone 44 or elsewhere and/or from verbal instruction, such as from personnel of the controlled environment facility. Preferably, the tutorial will at least instruct the user to place RFID tag 12 in the proximity of RFID reader 42 attached to or disposed near telephone 44 when a prompt is played. In preferred embodiments, the prompt is a very short tone audible to the resident.

Prompts may be provided to the user in addition to the foregoing RFID presentation prompts. For example, a user may be prompted to input information with respect to a transaction to be initiated. Such prompts may be provided under control of an RFID system of the present invention or may be native to the operation of another system, such as processing system 16. For example, processing system 16 may operate to prompt a user with respect to a particular desired transaction (e.g., place a telephone call, order commissary items, etcetera) and collect information with respect to that transaction (e.g., a phone number to be called, an account to be utilized, an item to be ordered, etcetera). Such information may be passed directly between telephone 44 and processing system 16 through RFID reader 42, or may be collected from telephone 44 by RFID reader 42 and transmitted to processing system 16.

At step 603, data stored by RFID tag 12 attached to a user attempting to initiate a transaction is obtained by RFID reader 42. For example, RFID interrogator 26 transmits an RF read signal over communication link 18 to RFID tag 12 and activates RFID tag 12. RFID tag 12 responds with data stored therein, sending the data back over communication link 18 to RFID interrogator 26. In some embodiments, the data comprises an identification number. According to preferred embodiments, the data is sent to controller 24, which may save the data in cache memory 50. The data is then sent to processing system 16 using communication adapter 22 via communication link 20.

According to a preferred embodiment, the data is communicated "in-band," or via signaling audible telephone 44, over communication link 20. Accordingly, communication adapter 22 may convert the data obtained by RFID interrogator 26 from a first form, such as digital or binary, to another form, such as dual tone multiple frequency (DTMF), conducive to in-band communication via communication link 22.

Such in-band communications facilitate ready retrofitting of processing systems and/or user terminals to accommodate RFID systems of the present invention. For example, processing system 16 may be configured to receive PIN information via DTMF, and thus may readily be retrofitted to accommodate RFID operation according to embodiments of the invention. In order to prevent a user from hearing in-band signaling, such as for security and/or user experience purposes, mute/sound control 54 may be controlled by controller 24 to mute telephone 44 during transmission of in-band signaling by communication adapter 22 and/or processing system 16. It should be appreciated that such muting may not only include muting the receiver of telephone 44 to prevent a user from hearing transmission of the signal, but it may also include muting transmission by telephone 44 to prevent spurious or malicious transmissions from telephone 44 from interfering with such signaling. Of course, embodiments of the invention may utilize out-of-band signaling, such as placing data on a sub-carrier or using a separate communication link, if desired.

At step 605, processing system 16 identifies the user, such as through referencing one or more databases using the data obtained from RFID tag 12. For example, processing system 16 of preferred embodiments receives the data and searches for matching data in one or more database associated therewith. Additionally, in embodiments of the present invention, processing system 16 retrieves information stored in the one or more database corresponding to the data. Preferably, the information comprises transaction processing information, such as call allowances and/or restrictions, for the identified user. Where processing system 16 comprises a call processing system, processing system 16 determines if the user is authorized to place the call to that phone number, on that day, at that time of the day, from that telephone, etcetera, by analyzing the information.

At step 606, processing system 16 determines if the user is authorized to conduct the desired transaction, such as to place a call to a phone number input by the user, to order commissary goods, etcetera. Further detail with respect to determining whether a user is authorized to conduct transactions is provided in the above referenced patent applications entitled "Information Management and Movement System and Method" and "Systems and Methods for Transaction and Information Management."

If the transaction is not authorized at step 606, processing according to the illustrated embodiment proceeds to step 614 wherein the transaction is terminated. For example, processing system 16 may operate to prevent further processing of the transaction and/or provide signaling to RFID reader 42 to prevent further processing of the transaction (e.g., to control mute/sound control 54 to mute the line). However, if the transaction is authorized, processing according to the illustrated embodiment proceeds to step 607 wherein the transaction is allowed to proceed. For example, call processing system 16 may further process the transaction (e.g., establish a desired telephone connection, initiate a commissary ordering algorithm, etcetera) and/or provide signaling to RFID reader 42 to facilitate further processing of the transaction (e.g., to control mute/sound control 54 to unmute the line). Where a user is authorized to place the call, for example, processing system 16 connects the call. Where a user is not authorized to place the call, processing system 16 does not connect the call in some embodiments of the present invention. Alternatively, processing system 16 may connect an unauthorized call such that investigative data, in the form of recorded calls, call event details, etcetera are captured for investigative purposes. An investigator or other personnel may be notified of such calls, perhaps in real-time allowing the investigator or other personnel to monitor the communication as it is transpiring.

In operation according to embodiments of the invention, RFID system 40 is operable to identify a user not only at the initiation of a transaction, but also during the transaction, such as periodically or randomly throughout the transaction. The user's identity may be verified one or more times at specific times and/or random times during the length of the transaction. In embodiments, processing system 16 plays the tone which prompts the caller to place RFID tag 12 in the proximity of RFID reader 42. Where the caller does not hold RFID tag 12 up to RFID reader 42 within a certain amount of time, such as 5 or 10 seconds, processing system 16 prompts the caller again by playing the tone and/or a voice recording directing the caller to place RFID tag 12 in the proximity of RFID reader 42. Where the caller does not comply, the transaction may be terminated in some embodiments of the invention. Alternatively, processing system 16 may allow the transaction to continue for investigative purposes, such as notifying an investigator, redirecting the call (where the transaction comprises a call) to an investigator and/or recording the call. Where the user does hold RFID tag 12 in the proximity of RFID reader 42, RFID interrogator 26 transmits an RF read signal over communication link 18 to RFID tag 12 and activates RFID tag 12. RFID tag 12 responds by again sending data stored therein back to RFID interrogator 26 over communication link 18.

Embodiments of the invention utilize one or more identification events in order to trigger a subsequent user identification sequence. Accordingly, at step 608 of the illustrated embodiment, a determination is made as to whether an identification event has occurred. Such identification events may comprise an epoch of time, a random event, occurrence of one or more predetermined events, and/or the like.

If an identification event has not occurred at step 608, processing according to the illustrated embodiment proceeds to step 609 wherein it is determined if the transaction has ended. If the transaction has not ended, processing according to the illustrated embodiment returns to step 607 wherein the transaction is allowed to proceed. However, if the transaction has ended, processing according to the illustrated embodiment proceeds to step 614 wherein the transaction is terminated.

If an identification event has occurred at step 608, processing according to the illustrated embodiment proceeds to steps 610-613 wherein the user is reidentified and/or validated. Specifically, the illustrated embodiment proceeds to step 610 wherein the user is prompted to present RFID tag 12 in proximity to RFID reader 42 for identifying the user. As discussed above, a short aural prompt (e.g., an aural icon or EARCON™) is played at step 610 to minimize the interruption to the transaction.

At step 611, data stored by RFID tag 12 attached to a user attempting to initiate a transaction is again obtained by RFID reader 42. The data is passed to controller 24 for revalidation of the user at step 612, although embodiments of the invention do not cause communication adapter 22 to transmit the data to processing system 16 as in the initial identification steps discussed above. According to preferred embodiments, wherein in-band signaling is utilized between communication adapter 22 and processing system 16, subsequent reidentification and/or validation of a user is performed by RFID reader 42, thereby minimizing interruption of the transaction and/or interfering with communication between telephone 44 and processing system 16.

In operation according to a preferred embodiment, controller 24 operates to store information obtained from RFID tag 12 during an initial query (e.g., at step 603) in cache memory 50. Accordingly, during a subsequent identification and/or verification step, information obtained from RFID tag 12 (e.g., at step 611) may be compared to previously obtained information, as stored in cache memory 50, for a determination as to whether the same user is present at telephone 44. In such an embodiment, the content of the information obtained from RFID tag 12 need not be retransmitted to processing system 16 for identification and/or validation. However, as processing system 16 may operate to control the transaction, or aspects thereof, based upon the continued presence of a user at telephone 44, embodiments of the invention operate to provide information indicating that the user has or has not been successfully subsequently identified and/or validated. For example, a very short (e.g., single bit or single DTMF tone) signal may be provided by communication adapter 22 to processing system 16 under control of controller 24 at step 612. Such a short signal minimizes the impact on the user experience and/or interruption of communications between telephone 44 and processing system 16. As with the initial signaling discussed above with respect to step 604, signaling provided at step 612 may comprise controller 24 controlling mute/sound control 54 to briefly mute telephone 44, to enhance the user experience and/or for security purposes.

At step 613, processing system 16 determines if the user is authorized to continue the desired transaction. If the user is not authorized, processing according to the illustrated embodiment proceeds to step 614, wherein the transaction is terminated. Alternatively, processing system 16 may allow the transaction to continue for investigative purposes, such as by notifying an investigative officer, redirecting the call to an investigative officer (where the transaction comprises a call), and/or recording the call. However, if the user is authorized, processing according to the illustrated embodiment returns to step 607 wherein the transaction is allowed to proceed.

Whether processing system 16 or the user terminates a transaction, RFID reader 42 of embodiments operates to detect the end of the transaction. For example, on/off detector 52 may detect when the receiver is placed on the hook, signaling the transaction has concluded Controller 24 may then erase the data stored in cache memory 50 so as to clear the cache for a next user identification sequence.

It should be appreciated that the various steps described above may be performed by any of a number of components of a system of embodiments of the invention. For example, algorithms (e.g., software code, firmware code, programmable gate arrays, application specific integrated circuits, and/or the like) may be provided at processing system 16 and/or RFID system 40 to provide operation as described herein. Accordingly, although the exemplary embodiment described above may have referenced particular components of a system when describing steps performed according to an embodiment, alternative embodiments may employ additional or alternative components in performing such steps.

Some embodiments of processing system 16 include or are in communication with a computer, a monitor, a printer, and/or any other object or device operable to collect information, such as may comprise saving, displaying and/or printing information. Accordingly, embodiments of the present invention may save, display, and/or print the received data and/or the retrieved information such that an interested party may view, analyze, and/or process it. Additionally or alternatively, processing system 16 may save, display, and/or print transaction details, such date, time, duration, phone used, phone number dialed, etcetera. Processing system 16 of preferred embodiments may record any or all parts of an unauthorized and/or authorized transactions. In operation with preferred embodiments, processing system 16 saves the recorded transactions. Processing system 16 of preferred embodiments will associate transaction details and/or recordings with at least one positively identified user such that the transaction details and/or recordings may be used as evidence against the one ore more users it is associated with.

Embodiments of the present invention may operate to control communications in a variety of modes. An embodiment of the invention operates in a stealth mode such that a call is completed without a party to the communication realizing the call has been or is being controlled by processing system 16. Accordingly, in stealth mode various control features, such as such as call allowing, blocking, recording, monitoring, locating, re-routing, call detail collection, etcetera, may be implemented without the calling and/or called party's knowledge.

A public mode is provided according to embodiments to announce or otherwise make public that communications are subject to control, such as may include call allowing, blocking, recording, monitoring, locating, re-routing, call detail collection, etcetera, by processing system 16. For example, processing system 16 may operate to cause a message to be announced (e.g., playing an audio message and/or tone on one or more communication devices, such as a telephone and/or a device in communication with the telephone) to indicate that a telephone and/or call made therewith are subject to control by processing system 16.

RFID readers of embodiments of the present invention are designed to withstand high humidity, high temperatures, and possible intrusion and/or tampering. Preferably, RFID readers are disposed in a hardened case, such as an epoxy case, especially where visible or easily accessed, such as in a prison facility. RFID readers of embodiments may be retrofitted to many, if not all, model phones in use today without the need for rewiring to accommodate for different requirements, such as power requirements. A processing system is typically connected to a telephone by 2 lines, tip and ring. Preferably, a RFID reader is connected to the lines between the processing system and the telephone. Accordingly, a RFID reader may communicate with the processing system and/or the telephone over the existing wiring. Moreover, the RFID reader may control the telephone's access to the processing system, such as to mute or disconnect the receiver of the telephone.

Figure 7C:
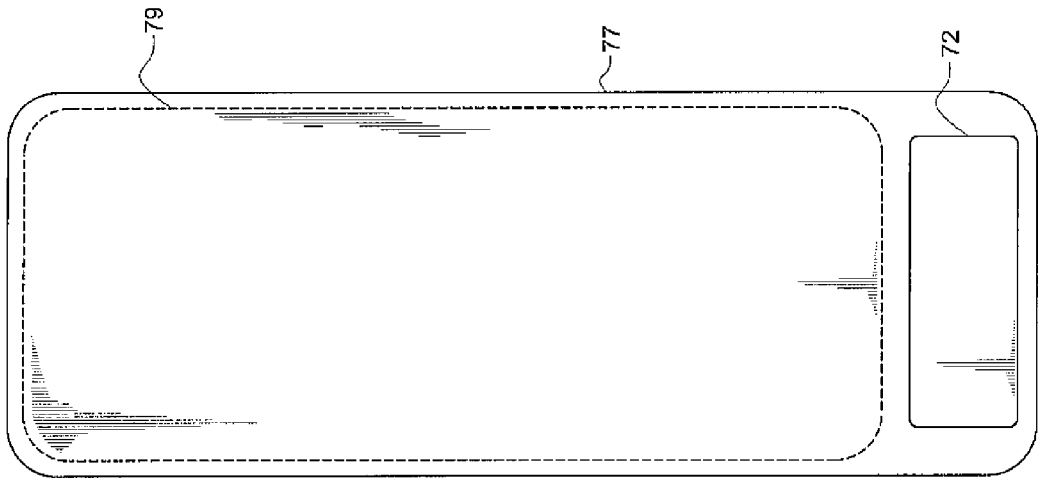
FIG. 7C shows a mounting plate for retrofitting a telephone for use in controlling calls with respect to a controlled environment facility in accordance with an embodiment of the present invention.
Figure 7B:
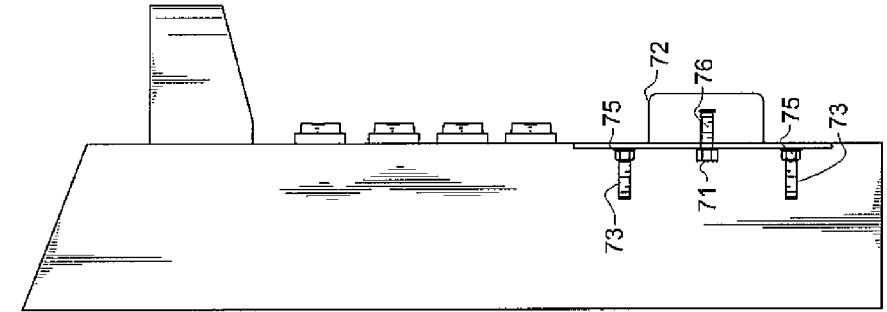
FIGS. 7A and 7B show a telephone adapted for use in controlling calls with respect to a controlled environment facility in accordance with an embodiment of the present invention.
Figure 7A:
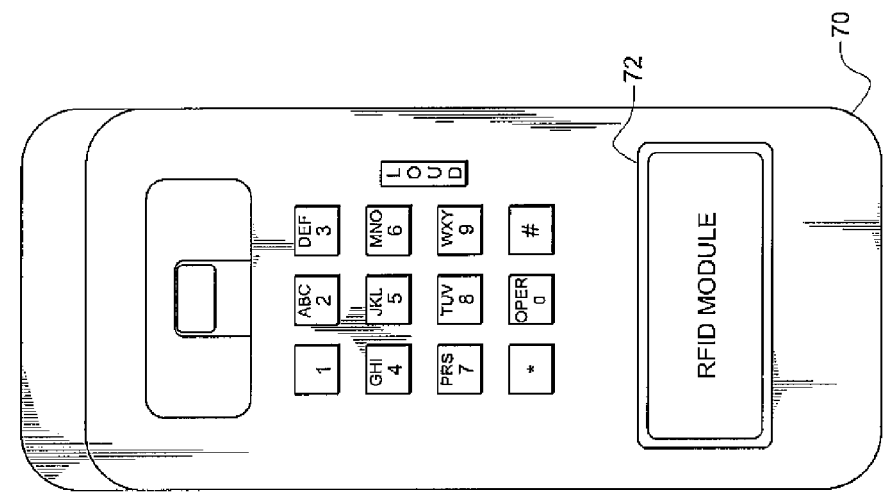

Referring now to FIGS. 7A and 7B, a phone adapted for use in controlling calls with respect to a controlled environment facility according to an embodiment of the invention is shown. Specifically, RFID reader 72 is shown attached to back plate 74, such as may comprise an information back plate which is ordinarily visible through an information window of telephone 70. RFID reader 72 may be mounted onto back plate 74 using any available means. For example, RFID reader 72 may have one or more threaded receiver 76 embedded in it for accepting a fastener, such as bolt 71, passing through back plate 74 and into threaded receiver 76. Back plate 74 may be secured using any available means to telephone 80. For example, studs 75 may extend from an inside surface of telephone 80, through a corresponding opening in back plate 74, and to be fastened using nuts 75. Of course, any number of other fastening means may be employed according to embodiments of the invention.

Embodiments may include RFID reader 72 disposed on the outside of telephone 70, as shown in FIG. 7B, or on the inside of telephone 70. For example, rather than extending through an information window of telephone 80 as described above, RFID reader 72, may be disposed behind the front surface of telephone 80, such as behind a RF transparent panel disposed in place of an information window of telephone 80. Alternatively, RFID reader 82 may be secured to a side of telephone 80 or a surrounding area, such as secured to a metal plate supporting telephone 80. Directing attention to FIG. 7C, an embodiment wherein RFID reader 72 is disposed upon a mounting plate to be mounted behind telephone 80 is shown. Specifically, plate 77 of an embodiment includes RFID reader 72 mounted therein, such as using treaded receiver 76 and bolt 71 described above. Plate 77 is sized and shaped to accept telephone 80 thereon, such as within area 79. Accordingly, telephone 80 may be removed from a wall mounting and mounted to plate 77. Thereafter, plate 77, having telephone 80 thereon, may be placed on the wall mounting to provide telephone 80 having RFID reader 72 securely disposed in proximity thereto.

In retrofitting telephone 80 to utilize RFID reader 72 of embodiments of the invention, a connection between telephone 80 and a processing system or telephone network is disconnected and RFID reader 72 disposed in the link. Accordingly, in embodiments of the invention, a telephone line originally coupled to telephone 80 may be coupled to RFID reader 72 and a line run from RFID reader 72 to telephone 80, thereby disposing RFID reader 72 in the connection between telephone 80 and a processing system or telephone network.

RFID readers utilized according to embodiments of the invention are preferably disposed in close proximity to a user terminal, such as telephone 80, in order to accommodate identification of individuals at various points, or continuously, throughout a transaction. It should be appreciated that the examples of RFID reader 72 provided in FIGS. 7A-7C above dispose RFID reader 72 in a position easily accessed by a user of telephone 80 during the use of telephone 80. Of course, other positions for RFID reader 72 may be utilized according to embodiments of the invention.

RFID tags of embodiments comprise an integrated circuit (IC) and an antenna, the integrated circuit serves to store data and the antenna functions to communicate (e.g., send and/or receive) the data. RFID tags of embodiments may comprise any form such as RFID badges, RFID bracelets, RFID wristbands, etcetera. RFID tags utilized with respect to residents of controlled environment facilities comprise a RFID wristband according to embodiments of the invention. Such RFID wristbands are preferably permanent RFID wristbands such that, once attached to a resident, they are rendered inoperable to communicate data stored in the integrated circuit if detached. Such RFID wristbands will not easily be stolen, traded or sold within a controlled environment facility, ensuring the integrity of the system and method described herein. Additionally, permanent RFID wristbands may comprise a tracking component. Accordingly, permanent RFID wristbands may be located when detached from the resident.

Figure 8:
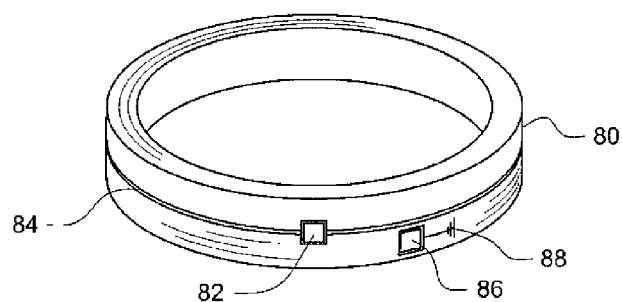
FIG. 8 shown a RFID wristband in accordance with an embodiment of the present invention.

Referring now to FIG. 8, a permanent RFID wristband according to an embodiment of the present invention is shown. Specifically, permanent RFID wristband 80 including integrated circuit 82 and antenna 84 (integrated circuit 82 and antenna 84 comprising a RFID tag according to embodiments) is shown. Integrated circuit 82 contains data associated with the identity of the resident carrying RFID wristband 80. Antenna 84 wraps around RFID wristband 80 such that if RFID wristband 80 is severed to remove RFID wristband 80 from the resident's wrist, antenna 84 is also severed. Antenna 84 would no longer be operable to communicate the data if severed, rendering permanent RFID wristband inoperable for identification purposes. Permanent RFID wristband 80 includes a second integrated circuit 86 and a second antenna 88 operable to communicate data corresponding to the location of the permanent RFID wristband 80. Where permanent RFID wristband 80 is severed, antenna 88 is not severed such that integrated circuit 86 of permanent RFID wristband 80 remains operable for tracking purposes.

Although the present invention and its advantages have been described in detail, it should be understood that various changes, substitutions and alterations may be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a plurality of radio frequency transponders;
a call processing system operable to validate a user and control calls to or from a user terminal; and
a radio frequency transducer having a first communication interface and a second communication interface, said first communication interface for coupling to a transaction processing system and said second communication interface for coupling to a user terminal, said radio frequency transducer operable to transmit data associated with a radio frequency transponder of said plurality of radio frequency transponders to said processing system via said first communication interface, said radio frequency transducer operable to transmit signals received from said user terminal via said second communication interface to said processing system via said first communication interface, said radio frequency transducer stores said data in a memory, said stored data is used to confirm the identity of said user at different points in a transaction.

2. The system of claim 1, wherein said first communication interface and said second communication interface comprise telephone line interfaces.

3. The system of claim 2, wherein said user terminal comprises a telephone.

4. The system of claim 2, wherein signals carrying said data transmitted by said radio frequency transducer to said processing system comprise telephone line in-band signals.

5. The system of claim 4, wherein said telephone line in-band signals comprise dual tone multiple frequency signals.

6. The system of claim 4, wherein said radio frequency transducer is operable to mute communications with respect to said user terminal during transmission of said telephone in-band signals.

7. The system of claim 2, wherein signals carrying said data transmitted by said radio frequency transducer to said processing system comprise telephone line out-of-band signals.

8. The system of claim 1, wherein said radio frequency transducer comprises:
a power supply drawing power from a link provided by said first communication interface and supplying power to a plurality of components of said radio frequency transducer.

9. The system of claim 1, wherein said radio frequency transducer comprises:
a communication control unit disposed in a link between said first communication interface and said second communication interface, said control unit operable to control communication between said user terminal and said processing system.

10. The system claim 1, wherein said radio frequency transducer comprises:
a controller operable to control interrogation of said radio frequency transponder to obtain data from said radio frequency transponder.

11. The system of claim 10, wherein said data transmitted by said radio frequency transducer to said processing system comprises said data obtained from said radio frequency transponder.

12. The system of claim 10, wherein said radio frequency transducer comprises:
a cache memory operable to store said data obtained from said radio frequency transponder.

13. The system of claim 12, wherein said controller is operable to interrogate said radio frequency transponder to re-obtain data from said radio frequency transponder and to compare said data re-obtained from said radio frequency transponder with said data stored in said cache memory, wherein said data transmitted by said radio frequency transducer to said processing system comprises an indication of a match or mismatch from said comparison.

14. The system of claim 1, wherein each radio frequency transponder of said plurality of radio frequency transponders have unique data stored therein, said unique data being associated with a corresponding individual's identity, wherein said data transmitted by said radio frequency transducer to said processing system comprises information with respect to identification of said corresponding individual.

15. The system of claim 1, wherein radio frequency transponders of said plurality of radio frequency transponders are disposed in bracelets.

16. The system of claim 15, wherein said bracelets are permanently associated with a corresponding individual.

17. The system of claim 16, wherein said corresponding individual comprises a resident of a controlled environment facility.

18. The system of claim 16, wherein said radio frequency transponder comprises structure circumnavigating said bracelet such that when said bracelet is removed from said corresponding individual said radio frequency transponder becomes inoperable.

19. The system of claim 18, wherein said bracelet comprises a second radio frequency transponder which remains operable when said bracelet is removed from said corresponding individual.

20. The system of claim 1, wherein radio frequency transponders of said plurality of radio frequency transponders are disposed in badges.

21. The system of claim 20, wherein said badges are associated with a corresponding individual, wherein said corresponding individual comprises a visitor to a controlled environment facility.

22. The system of claim 1, wherein said radio frequency transducer is affixed to a surface of said user terminal.

23. The system of claim 1, wherein said radio frequency transducer is affixed to a mounting plate, wherein said user terminal is disposed on said mounting plate.

24. The system of claim 1, wherein said radio frequency transducer is disposed in a position to facilitate a user presenting said radio frequency transponder for interaction with said radio frequency transducer during use of said user terminal.

25. The system of claim 1, wherein said radio frequency transducer comprises an epoxy shell incarcerating a plurality of components of said radio frequency transducer.

26. A method comprising:
disposing a radio frequency reader in a communication link between a user terminal and a processing system;
prompting a user to present a radio frequency tag in proximity to said radio frequency reader during use of said user terminal by said user;
transmitting data associated with said radio frequency tag from said radio frequency reader to said processing system via said communication link;
storing said data in a memory on said RFID reader, said stored data is used to confirm the identity of said user at different points in a transaction; and
controlling at least an aspect of said user's use of said user terminal as a function of said data transmitted to said processing system.

27. The method of claim 26, wherein said disposing said radio frequency reader in said communication link comprises retrofitting said user terminal to support radio frequency identification functions.

28. The method of claim 26, wherein said disposing said radio frequency reader in said communication link comprises decoupling said user terminal from said communication link, coupling said radio frequency reader to said communication link, and coupling said user terminal to said radio frequency reader.

29. The method of claim 26, wherein said communication link comprises a telephone line.

30. The method of claim 26, further comprising:
detecting an off-hook condition at said user terminal, wherein said prompting said user is in response to said detecting said off-hook condition.

31. The method of claim 26, wherein said prompting is provided upon said user initiating a transaction using said user terminal.

32. The method of claim 26, wherein said prompting comprises playing a message informing said user of a audible prompt for presenting said radio frequency tag in proximity to said radio frequency reader throughout a transaction.

33. The method of claim 26, further comprising:
muting communications with respect to said user terminal during said transmitting said data from said radio frequency reader to said processing system.

34. The method of claim 26, further comprising:
reading data from said radio frequency tag by said radio frequency reader, wherein said data transmitted from said radio frequency reader to said processing system comprises at least a portion of said radio frequency data.

35. The method of claim 34, further comprising:
storing said radio frequency tag data in a memory of said radio frequency reader;
re-reading data from said radio frequency tag by said radio frequency reader;
comparing said re-read data to said stored data; and
transmitting data indicative of a result of said comparison from said radio frequency reader to said processing system via said communication link.

36. The method of claim 26, wherein said data transmitted from said radio frequency reader to said processing system comprises at least a portion of information obtained from said radio frequency tag.

37. The method of claim 26, wherein said data transmitted from said radio frequency reader to said processing system comprises an indication of a result of a comparison of at least a portion of information obtained from said radio frequency tag with information stored by said radio frequency reader.

38. The method of claim 26, wherein said transmitting said data comprises transmitting said data in-band with respect to communications between said user terminal and said processor system.

39. The method of claim 26, wherein said transmitting said data comprises transmitting said data out-of-band with respect to communications between said user terminal and said processor system.

40. The method of claim 26, wherein said controlling at least an aspect of said user's use of said user terminal comprises:
   terminating a transaction conducted by said user using said user terminal.

41. The method of claim 26, wherein said controlling at least an aspect of said user's use of said user terminal comprises:
   notifying an investigator.

42. The method of claim 26, wherein said controlling at least an aspect of said user's use of said user terminal comprises:
   recording a call conducted by said user using said user terminal.

43. A RFID system for controlling transactions associated with a controlled environment facility, said RFID system comprising:
   a RFID tag securely associated with a person attempting a transaction associated with a controlled environment facility, wherein said RFID tag contains data associated with the identity of said person;
   a RFID reader in communication with a user terminal used by said person in conducting said transaction, said RFID reader in wireless communication with said RFID tag;
   said RFID reader stores said data in a memory, said stored data is used to confirm the identity of said person at different points in said transaction; and
   a processing system in communication with said RFID reader and operable to cooperate with said RFID reader to control transactions conducted using said user terminal in accordance with control features implemented by said processing system.

44. The system of claim 43, wherein said control features are with respect to said user terminal.

45. The system of claim 43, wherein said control features are with respect to said person.

46. The system of claim 43, wherein said control features are with respect to another party to said transaction.

47. The RFID system of claim 43, wherein said control features comprise at least one of allowed action analysis, not allowed action analysis, recording action analysis, monitoring action analysis, and investigative data collection.

48. The RFID system of claim 43, wherein said processing system is operable to control actions within said controlled environment facility in a plurality of modes.

49. The RFID system of claim 48, wherein said plurality of modes comprises a stealth mode in which said person is not made aware of controlling by said processing system.

50. The RFID system of claim 48, wherein said plurality of modes comprises a public mode in which said person is made aware of controlling by said processing system.

51. The RFID system in claim 43, wherein said controlled environment facility comprises a prison facility.

52. The RFID system in claim 43, wherein said person comprises an inmate.

53. The RFID system in claim 43, wherein said transaction comprises a telephone call.

54. The RFID system of claim 43, wherein said transaction comprises purchase of a commissary item.

55. The RFID system in claim 43, wherein said transaction comprises entering or exiting an area.

56. The RFID system in claim 43, wherein said RFID tag is configured to be rendered inoperable if removed from said person.

57. The RFID system in claim 56, wherein said RFID tag further contains a tracking component.

58. A method for controlling transactions associated with a controlled environment facility, the method comprising:
   providing a RFID tag in association with a person attempting a transaction, said RFID tag containing data associated with the identity of said person;
   providing a RFID reader in communication with a user terminal through which said transaction will be performed, said RFID reader in wireless communication with said RFID tag;
   providing a processing system in communication with said RFID reader; obtaining data from said RFID tag by said RFID reader;
   storing said data in a memory on said RFID reader, said stored data is used to confirm the identity of said person at different points in said transaction;
   determining if said person is authorized to perform said transaction; and proceeding with respect to said transaction.

59. The method of claim 58, wherein said person comprises a resident of said controlled environment facility.

60. The method of claim 58, wherein said person comprises a visitor to said controlled environment facility.

61. The method of claim 58, wherein said controlled environment facility comprises a prison facility.

62. The method of claim 58, wherein said action comprises a communication and said user terminal comprises a communications device.

63. The method of claim 62, wherein said communication comprises a telephone call and said RFID reader is disposed in a telephone line coupling said user terminal to said processing system.

64. The method of claim 58, wherein said confirming is done at specific times.

65. The method of claim 58, wherein said confirming is done at random times.

* * * * *